(12) United States Patent
Fujiki (10) Patent No.: US 12,203,235 B2
(45) Date of Patent: Jan. 21, 2025

(54) WORK VEHICLE

(71) Applicant: YANMAR POWER TECHNOLOGY CO., LTD., Osaka (JP)

(72) Inventor: Katsumi Fujiki, Fukuoka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 17/768,589

(22) PCT Filed: Nov. 13, 2020

(86) PCT No.: PCT/JP2020/042430
§ 371 (c)(1),
(2) Date: Apr. 13, 2022

(87) PCT Pub. No.: WO2021/131389
PCT Pub. Date: Jul. 1, 2021

(65) Prior Publication Data
US 2024/0110360 A1 Apr. 4, 2024

(30) Foreign Application Priority Data
Dec. 26, 2019 (JP) .................................. 2019-236938

(51) Int. Cl.
E02F 3/38 (2006.01)
E02F 3/34 (2006.01)
E02F 9/02 (2006.01)

(52) U.S. Cl.
CPC ............ *E02F 3/382* (2013.01); *E02F 3/3414* (2013.01); *E02F 9/02* (2013.01)

(58) Field of Classification Search
None
See application file for complete search history.

(56) References Cited

U.S. PATENT DOCUMENTS

| 9,695,570 B2 | 7/2017 | Ito | |
| 2007/0128012 A1* | 6/2007 | Yamada | E02F 3/3405 |
| | | | 414/700 |
| 2016/0090710 A1 | 3/2016 | Takemura et al. | |

FOREIGN PATENT DOCUMENTS

| JP | 46-26299 B1 | 7/1971 |
| JP | 2006-307498 A | 11/2006 |

(Continued)

OTHER PUBLICATIONS

International Search Report and Written Opinion for PCT Patent App. No. PCT/JP2020/042430 (Jan. 12, 2021).

*Primary Examiner* — Michael S Lowe
(74) *Attorney, Agent, or Firm* — Future IP LLC; Tomoko Nakajima (57) ABSTRACT

A work vehicle according to the present embodiment comprises: a vehicle body; a pair of traveling parts disposed on both sides of the vehicle body; a cabin which is a front part of the vehicle body and disposed above the traveling parts; an arm which is disposed above the traveling parts and extends forward from behind the cabin and which is pivoted so as to be capable of swinging upward and downward; a first link for connecting the vehicle body and the arm; a cylinder for swinging the arm; a second link which is disposed between the arm and the traveling parts, and restricts the swing direction of the arm; a first pivoting part for pivoting one end of the first link; and a sixth pivoting part for pivoting the other end of the second link at a protruding end of a protrusion part protruding from the arm.

3 Claims, 5 Drawing Sheets

(56) References Cited

FOREIGN PATENT DOCUMENTS

| JP | 2016-030910 A | 3/2016 |
|----|---------------|--------|
| JP | 2016-069996 A | 5/2016 |

* cited by examiner

WORK VEHICLE

This application is a national phase entry under 35 U.S.C. § 371 of PCT Patent Application No. PCT/JP2020/042430, filed on Nov. 13, 2020, which claims priority under 35 U.S.C. § 119 to Japanese Patent Application No. 2019-236938, filed Dec. 26, 2019, all of which are incorporated by reference.

TECHNICAL FIELD

The present disclosure relates to a work vehicle.

BACKGROUND ART

Patent Literature 1 listed below discloses a technology related to a work vehicle including a vehicle body, a cabin arranged at a front portion of the vehicle body, an arm pivotally connected in a manner capable of oscillating up and down, a first link that connects the vehicle body and the arm, and a cylinder that oscillates the arm. Furthermore, the first link and the cylinder are collectively arranged together at both lateral sides behind the cabin.

CITATION LIST

Patent Literature

Patent Literature 1: Unexamined Patent Application Publication No. 2016-30910

DISCLOSURE OF INVENTION

Problems to be Solved by the Invention

However, Patent Literature 1 suffers from a problem that a view field on the rear lateral sides of the cabin is obstructed by the first link and the cylinder, so that visibility on the rear lateral sides of the cabin is poor.

Therefore, in view of the above-described problem, an object of the present disclosure is to provide a work vehicle having good visibility on the rear lateral sides of the cabin.

Means for Solving the Problems

A work vehicle includes: a vehicle body; a pair of traveling parts arranged on both lateral sides of the vehicle body; a cabin arranged at a front portion of the vehicle body above the traveling parts; an arm that extends from rear to front of the cabin above the traveling parts and that is pivotally connected in a manner capable of oscillating up and down; a first link that connects the vehicle body and the arm; a cylinder that oscillates the arm; a second link that is arranged between the arm and the traveling parts, and that regulates an oscillating direction of the arm; a first pivoting part that pivotally connects one end of the first link; a second pivoting part that pivotally connects an other end side of the first link and a rear end side of the arm, a third pivoting part that is arranged in front of the second pivoting part and that pivotally connects one end of the cylinder; a fourth pivoting part that pivotally connects an other end of the cylinder; a fifth pivoting part that pivotally connects one end of the second link at a position further front than the first pivoting part and the fourth pivoting part; and a sixth pivoting part that pivotally connects an other end of the second link at a tip end of an extended part that extends from the arm in front of the third pivoting part, in which in a state that the arm is lowered downward, the sixth pivoting part is arranged between the traveling part and the cylinder.

This configuration allows to provide a visual recognition space between the first link and the cylinder. Accordingly, an operator in the cabin is able to look in either rear lateral direction through either visual recognition space between the first link and the cylinder, so that the visibility on the rear lateral sides of the cabin is improved.

DESCRIPTION OF EMBODIMENTS

In the following, an embodiment of the present disclosure will be described with reference to the drawings.

A configuration of a work vehicle 1 of the embodiment will be described in connection with FIG. 1. In the embodiment, the work vehicle 1 is a compact track loader, but not limited thereto. It may be, for example, a skid-steer loader.

The work vehicle 1 includes: a vehicle body 2; a pair of traveling parts 3 arranged on both lateral sides of the vehicle body 2; a cabin 4 that is arranged in front of the vehicle body 2 and above the traveling parts 3, and that is adapted for riding by an operator; an arm 5 that extends from rear to front of the cabin 4 above the traveling parts 3 and that is pivotally connected in a manner capable of oscillating up and down; a first link 6 that connects the vehicle body 2 and the arm 5; a cylinder 7 that oscillates the arm 5, a second link 8 that is arranged between the arm 5 and the traveling parts 3 and that regulates the oscillating direction of the arm 5; a cover part 9 that partly covers the first link 6, the cylinder 7, and the second link 8 (see FIG. 4); and a work part 10 that is pivotally connected at a front portion of the arm 5. FIG. 1 illustrates a state that the arm 5 is oscillated downward and the cover part 9 is removed.

The vehicle body 2 includes: a hood 11 arranged at the rear end of the vehicle body 2; an engine (not illustrated) that is arranged in front of the hood 11 and that produces power; an eighth pivoting part (not illustrated) that is arranged at the right rear end of the vehicle body 2 and that serves to open and close the hood 11; and a ninth pivoting part P9 that is arranged behind the cabin 4 and at the upper portion of the vehicle body 2, and that serves to open and close the cabin 4. The hood 11 draws an opening/closing locus about the eighth pivoting part in a top view.

The traveling parts 3 each includes: a plurality of pumps (not illustrated) driven by rotation of the output shaft of the engine; a motor (not illustrated) that is driven by pumping of a hydraulic oil by a travel pump among the plurality of pumps; a drive wheel 13 mounted to the rotating shaft of the motor; a driven part 14 that is arranged under the drive wheel 13 and that is fixed on either lateral side of the lower portion of the vehicle body 2; and a crawler 15 that has a form of an endless belt and that is provided in a tensioned state by the drive wheel 13 and the driven part 14 so that a triangle crawler is provided. Arranging the drive wheel 13 at the upper portion of the traveling part 3 allows to prevent the drive wheel 13 from biting the earth and sand which are caught up by the crawler 15.

The drive wheel 13 is a sprocket, having a plurality of teeth 13*a* to be meshed with the crawler 15 for transmitting a driving force to the crawler 15. Providing a cutout 213*a* by cutting out the rear end of the roof part 211*a* described later allows to increase the diameter of the drive wheel 13. Increasing the diameter of the drive wheel 13, that is, increasing the number the teeth 13*a* allows to increase the number of teeth meshing with the crawler 15, allows to reduce a driving force of the motor applied to each of the teeth 13*a*, and hence allows to improve the durability of the drive wheel 13 and a metal core 15*b* of the crawler 15.

The driven part 14 includes: a plurality of track rollers 16 arranged in parallel in the front-rear direction under the drive wheel 13; a first driven wheel 17 and a second driven wheel 18 that are arranged respectively in front of and behind the plurality of track roller 16; a tension adjustment part 19 that pushes the first driven wheel 17 forward to adjust the tension of the crawler 15; an equalizer 20 that connects some of the plurality of track rollers 16; and a support part 21 to which the plurality of track rollers 16, the first driven wheel 17, the second driven wheel 18, the tension adjustment part 19, and the equalizer 20 are mounted.

The track rollers 16 includes a first track roller 16*a*, a second track roller 16*b*, a third track roller 16*c*, and a fourth track roller 16*d*, in this order from the front. The first track roller 16*a* and the fourth track roller 16*d* are rotatably mounted to the support part 21. Furthermore, the second track roller 16*b* and the third track roller 16*c* are rotatably mounted to the equalizer 20. However, not limited thereto, the first track roller 16*a*, the second and third track rollers 16*b* and 16*c*, and the fourth track roller 16*d* may be individually mounted to the equalizer 20 in a rotatable manner.

Figure 1:
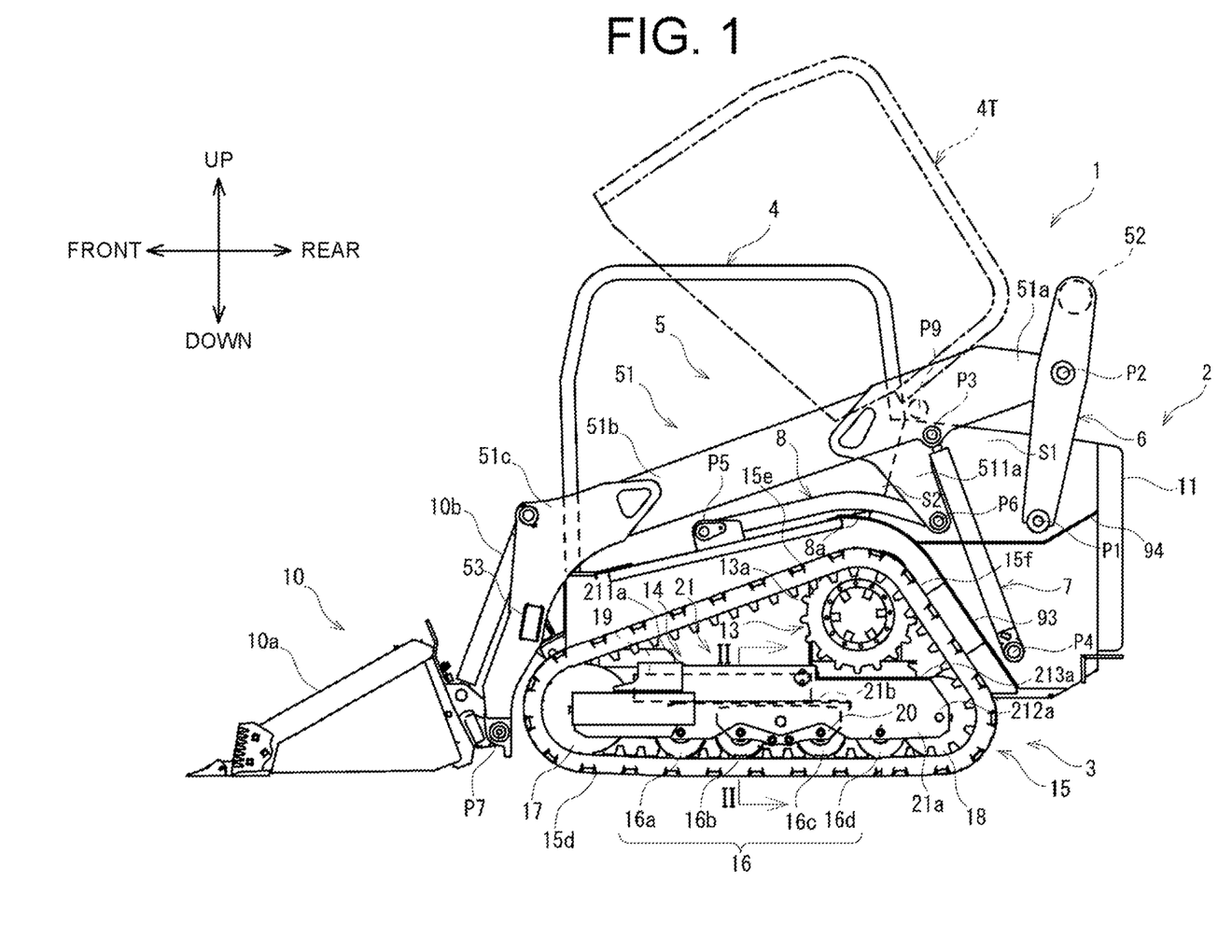
FIG. 1 is a left side view illustrating a general configuration of a work vehicle according to an embodiment of the present disclosure.
Figure 2:
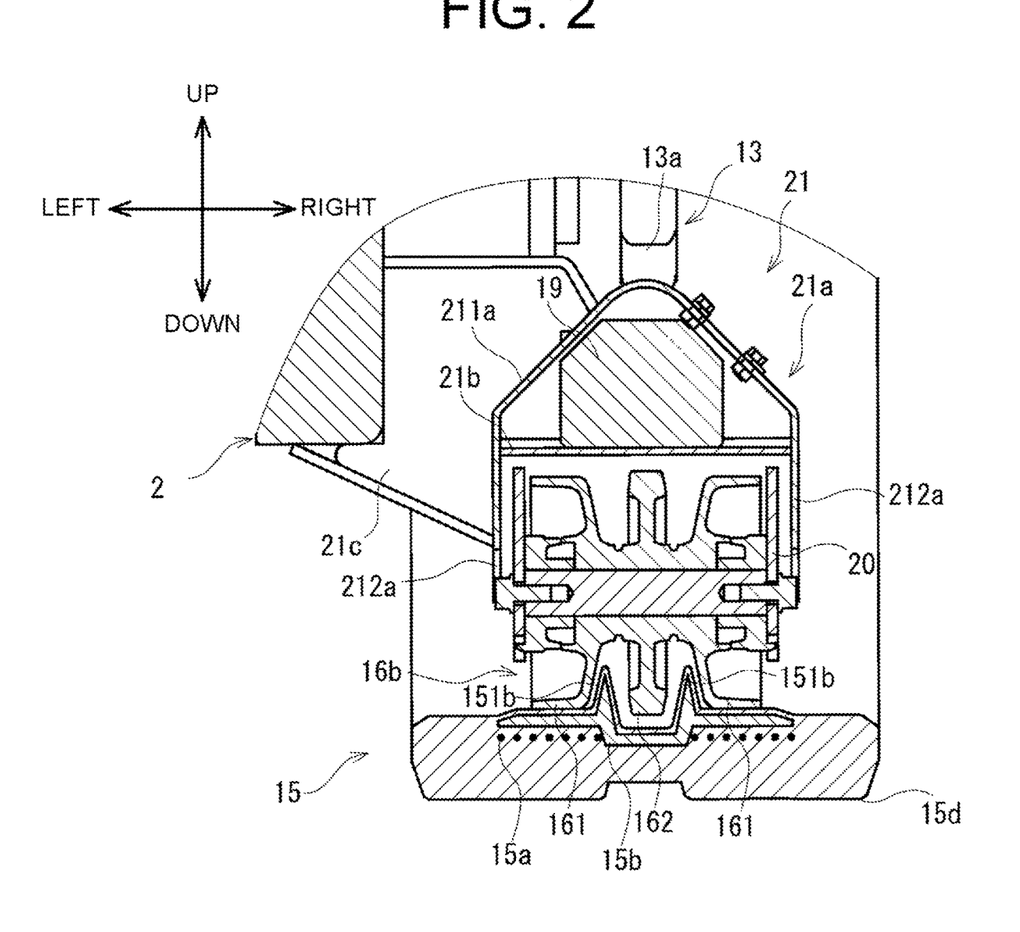
FIG. 2 is an enlarged cross sectional view of a main part taken along line II-II in FIG. 1.

As illustrated in FIG. 2, the second track roller 16*b* has a pair of first wheels 161 and 161 that are in contact with the crawler 15, and a second wheel 162 that is arranged between the first wheels 161 and 161, and that is greater than the first wheels 161 and 161 in diameter. The first track roller 16*a* and the third track roller 16*c* (see FIG. 1) have the same configuration as the second track roller 16*b*, whereas the fourth track roller 16*d* (see FIG. 3) has only a pair of first wheels 161 and 161. However, not limited thereto, the fourth track roller 16*c* may be similar to the second track roller 16*b* in configuration.

The first wheels 161 and 161 are respectively arranged at positions that sandwich projections 151*b* and 151*b* described later, and the second wheel 162 is arranged between the projections 151*b* and 151*b*. This allows the second wheel 162 to contact the projections 151*b* and 151*b*, for example, when the second track roller 16*b* tilts, whereby falling-off of the second track roller 16*b* is able to be prevented.

As illustrated in FIG. 1, the first driven wheel 17 is mounted to the support part 21 in a manner rotatable and movable in the front-rear direction. This allows the crawler 15 to be tensioned by pushing forward the first driven wheel 17 by the tension adjustment part 19 having a compression spring (not illustrated).

The equalizer 20 is connected to the support part 21 in an oscillatable manner via an unillustrated elastic body. This configuration allows the equalizer 20 to oscillate the second track roller 16*b* and a third track roller 16*c* when running over obstacles such as stones during traveling on soft ground or rough terrain, whereby shocks from the ground is able to be absorbed. Accordingly, for example, road ability and durability of the traveling part 3 is able to be improved. Furthermore, since the equalizer 20 is pivotally connected to the support part 21 via the elastic body, the elastic body absorbs shocks from the earth when running over obstacles such as stones, so that, for example, traveling vibrations are able to be reduced. In this embodiment, the elastic body is a rubber bushing, but it is not limited thereto.

Figure 3:
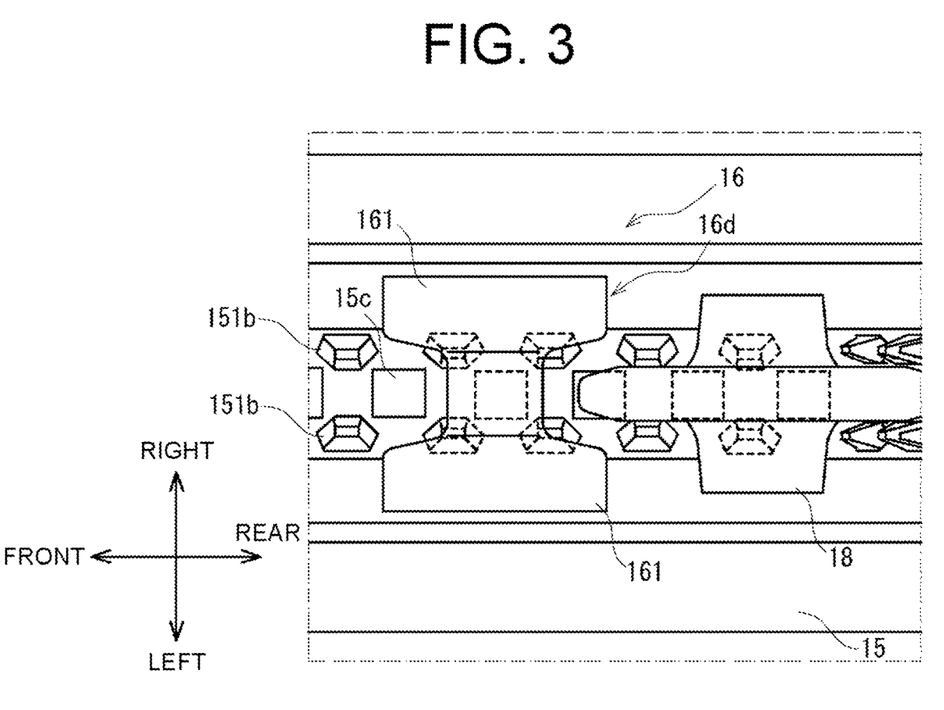
FIG. 3 is a top view illustrating a positional relationship among a fourth track roller, a second driven wheel, and a crawler according to the same embodiment.

The second driven wheel 18 is rotatably mounted to the support part 21. Furthermore, as illustrated in FIG. 3, the second driven wheel 18 is arranged at a position at which a part of the second driven wheel 18 enters between the first wheels 161 and 161, and the second driven wheel 18 and the fourth track roller 16*d* are overlapped in a side view. This configuration serves to increase the outer diameter of the track roller 16 by arranging the second driven wheel 18 and the fourth track roller 16*d* in a manner overlapped in a side view. Accordingly, for example, the bearing stresses on the raceway surface between the track rollers 16 and crawler 15 is reduced, so that wear caused by contact between the track rollers 16 and the crawler 15 is able to be suppressed. Furthermore, the distance between the fourth track roller 16*d* and the second driven wheel 18 is able to be made narrower, so that, for example, a coming-off frequency of the crawler 15 is able to be suppressed.

As illustrated in FIG. 2, the support part 21 includes: a support body 21*a* to which the second track roller 16*b*, etc., is mounted; a fixing plate 21*b* that is arranged inside the support body 21*a* and that fixes the tension adjustment part 19; and a fixing part 21*c* that fixes the support body 21*a* to the vehicle body 2.

The support body 21*a* includes at its upper portion a roof part 211*a* having a substantially isosceles triangle shape in cross section, and further includes a pair of side wall parts 212*a* and 212*a* which extend downward from the roof part 211*a* and to which the second track roller 16*b*, etc., are mounted. This serves to prevent the earth and sand caught up by the crawler 15 from accumulating on the support body 21*a*.

The roof part 211*a* includes at its rear end the cutout 213*a* that avoids the drive wheel 13 (see FIG. 1) This configuration serves to make greater the diameter of the drive wheel 13, compared with a case in which no cutout 213*a* is provided. Increasing the diameter of the drive wheel 13, that is, increasing the number the teeth 13*a* allows to increase the number of teeth meshing with the crawler 15, allows to reduce a driving force of the motor applied to each of the teeth 13*a*, and hence allows to improve the durability of the drive wheel 13 and the metal core 15*b* of the crawler 15.

The crawler 15 is embedded with a plurality of steel cords 15*a* that transmit the power from the drive wheel 13 to the whole crawler 15 and a plurality of metal cores 15*b* that prevent the drive wheel 13 and the driven part 14 from falling off. The crawler 15 includes a plurality of drive holes 15*c* to be engaged with the teeth 13*a* (see FIG. 3) and a plurality of knobby lugs 15*d* arranged all around outer periphery of the crawler 15 and adapted to contact the ground, and drive holes 15*c* and the knobby lugs 15*d* are arranged between either pair of mutually adjacent metal cores 15*b* that are uniformly spaced. The crawler 15 further includes a first slope 15*e* extending from the center of the drive wheel 13 to the first driven wheel 17 (see FIG. 1), and a second slope 15*f* extending from the center of the drive wheel 13 to the second driven wheel 18 (see FIG. 1)

The metal core 15b is bilaterally symmetrical to the circumferential center of the crawler 15, and includes projections 151b and 151b that project toward radially inside of the crawler 15.

As illustrated in FIG. 1, the cabin 4 is box-shaped, arranged above the front portion of the vehicle body 2, capable of being opened and closed in the top-bottom direction about a ninth pivoting part P9, and capable of being maintained such as by replacing unillustrated hydraulic equipment and hoses in an open position 4T in which the cabin 4 is opened. Furthermore, the operator is able to get on and off from the front by opening a front door (not illustrated) that is pivotally connected at the front portion of the cabin 4. Furthermore, a seat on which the operator sits, a control lever for controlling the arm 5, and other unillustrated parts are arranged in the cabin 4.

The arm 5 includes: a pair of arm parts 51 and 51 arranged on both lateral sides of the cabin 4; a first connection part 52 that indirectly connects the arm parts 51 and 51 at the upper ends of first arm parts 51a and 51a (described later); and a second connection part 53 that connects the arm parts 51 and 51 in front of the vehicle body 2. Arranging the first connection part 52 at the upper ends of the first arm parts 51a and 51a allows, for example, the first connection part 52 to avoid collision with the cabin 4 caused by opening and closing the cabin 4 and caused by oscillation of the arm 5. However, not limited thereto, the first connection part 52 may directly connects the arm parts 51 and 51 at the rear ends of the arm parts 51 and 51.

The arm part 51 includes: the first arm part 51a that extends from above the upper part of the vehicle body 2 to near rear middle of the cabin 4; a second arm part 51b that extends from front of the first arm part 51a to further lower-forward than the cabin 4; and the third arm part 51c that extends forward from the front of the second arm part 51b and is curved downward.

The arm part 51 is integral with the first arm part 51a and the second arm part 51b being connected at their ends and with the second arm part 51b and the third arm part 51c being connected at their ends. However, not limited thereto, the arm part 51 may be formed by a single member without being divided into the first arm part 51a, the second arm part 51b, and the third arm part 51c.

The vehicle body 2 includes: a first pivoting part P1 that pivotally connects one end of the first link 6 at an upper rear portion of the vehicle body 2; a fourth pivoting part P4 that pivotally connects one end of the cylinder 7 at a lower portion of the vehicle body 2 further front than the first pivoting part P1; and a fifth pivoting part P5 that pivotally connects one end of the second link 8 at a position that is further front than the first pivoting part P1 and the fourth pivoting part P4 and that is above the front portion of the vehicle body 2. However, not limited thereto, the fourth pivoting part P4 may be arranged at a position further rear than the first pivoting part P1.

The first arm part 51a includes: a second pivoting part P2 that pivotally connects the first link 6 at the rear end of the first arm part 51a at a state that the arm 5 is lowered downward; a third pivoting part P3 that pivotally connects the other end of the cylinder 7 at a position further front than the second pivoting part P2; an approximately-triangular extended part 511a that extends downward of the first arm part 51a at a position further rear than the fifth pivoting part P5 and further front than the third pivoting part P3; and a sixth pivoting part P6 that pivotally connects the other end of the second link 8 at the lower end of the extended part 511a at a position further rear than the fifth pivoting part P5.

It is preferable that the extended part 511a be disposed along the direction perpendicular to the arm 5 at a position that avoids interference with the traveling part 3. This allows to lower the mounting portion of the arm 5 in a state that the arm 5 is lowered downward, and allows to make wider a first visual recognition space S1 described later, so that the visibility on the lateral sides and rear lateral sides of the vehicle body 2 is able to be improved.

Furthermore, it is preferable that the length of the extended part 511a along the direction perpendicular to the arm 5 be sufficiently long for the second link 8 (described later) to be arranged parallel to the second slope 15f of the crawler 15. Accordingly, even when the mounting portion of the arm 5 is lowered as described above in a state that the arm 5 is lowered downward, a second visual recognition space S2 is able to be provided between the arm 5 and the second link 8.

The first link 6 is a connecting member that connects the vehicle body 2 and the arm 5. This first link 6 has, for example, a substantially rectangular or substantially elliptical shape, is pivotally connected at one end to the first pivoting part P1 of the vehicle body 2, and is connected at the other end to the first connection part 52. Furthermore, the first link 6 is pivotally connected at its intermediate portion to the second pivoting part P2 of the arm 5. When the first link 6 with this configuration allows the arm 5 to be oscillated in the top-bottom direction as described later, an intermediate portion of the first link 6 pivotally connected to the second pivoting part P2 of the arm 5 is turned using one end of the first link 6 pivotally connected to the first pivoting part P1 of the vehicle body 2 as a fulcrum, so that the bucket 10a is vertically oscillated.

The cylinder 7 is an oscillating member that oscillates the arm 5 in the top-bottom direction by performing an extension-contraction operation. The cylinder 7 is pivotally connected at one end to the fourth pivoting part P4 of the vehicle body 2, and is pivotally connected at the other end to the third pivoting part P3 of the arm 5. It is preferable that the cylinder 7 being arranged parallel to the extended part 511a of the arm 5. This allows to arrange the cylinder 7 close to the extended part 511a of the arm 5, so that the first visual recognition space S1 is able to made wider.

The second link 8 is a regulating member that regulate the oscillating direction of the arm 5 in connection with the extension-contraction operation of the cylinder 7. The second link 8 is a curved member including an upward-convex bend 8a at its intermediate position. The second link 8 is pivotally connected at one end to the sixth pivoting part P6 of the arm 5, and is pivotally connected at the other end to the fifth pivoting part P5 of the vehicle body 2. In a state that the arm 5 is lowered downward, the second link 8 is arranged along the outer shape of the traveling part 3, and the bend 8a is arranged above the drive wheel 13. This allows to avoid interference between the second link 8 and the crawler 15, and allows to bring the second link 8 as close as possible to the traveling part 3.

In a state that the arm 5 is lowered downward, the first pivoting part P1 is arranged at a position further front than the second pivoting part P2. Furthermore, the cylinder 7 is arranged parallel to the extended part 511a that is arranged perpendicularly to the arm 5, and the fourth pivoting part P4 is arranged at a position further rear than the third pivoting part P3. This configuration allows to provide the first visual recognition space S1 between the first link 6 and the cylinder 7. This allows the operator in the cabin 4 to look in either rear lateral direction through either first visual recognition space S1, so that the visibility on the rear lateral sides of the cabin 4 is improved. Furthermore, the first pivoting part P1 is arranged close to the cylinder 7 without interfering with turning of the cylinder 7, so that it becomes possible to lower the position of the second pivoting part P2 and to arrange the arm 5 at a lower position, so that the visibility is further improved.

In a state that the arm 5 is lowered downward, the fifth pivoting part P5 is arranged at the same level as the sixth pivoting part P6 above the first slope 15e, and the sixth pivoting part P6 is arranged between the second slope 15f and the cylinder 7. However, not limited thereto, the fifth pivoting part P5 may be arranged at a level lower than the sixth pivoting part P6. In a case of a skid steer loader, for example, the sixth pivoting part P6 may be arranged between the drive wheel 13 and the cylinder 7.

The first link 6, the cylinder 7, and the second link 8 are arranged on either lateral side of the vehicle body 2. However, not limited thereto, the cylinder 7 may be provided, for example, on only one lateral side of the vehicle body 2.

As described above, the second link 8 has a bend 8a that conforms to the outer shape of the crawler 15. However, not limited thereto, the bend 8a may have a shape that conforms to the outer shape of the drive wheel 13. This configuration allows the sixth pivoting part P6 to be arranged between the drive wheel 13 and the cylinder 7, and thus the entire arm 5 is allowed to be arranged lower than hitherto, so that, for example, the visibility on both lateral sides of the cabin 4 is improved. Furthermore, since the entire arm 5 is arranged lower than hitherto, the center of gravity of the entire work vehicle 1 is lowered, so that, for example, the stability of the center of gravity of the work vehicle 1 increases.

Furthermore, the second link 8 is arranged between the arm 5 and the traveling part 3, so that the second arm part 51b and the second link 8 do not intersect even if the arm 5 is oscillated up and down. This configuration allows to arrange the second link 8 and the second arm part 51b arranged so as to be overlapped in a top view. Accordingly, for example, the cabin 4 is able to be made larger in the left-right direction, so that the comfort in the cabin 4 is able to be ensured.

The work part 10 includes: a bucket 10a that is pivotally connected at the seventh pivoting part P7 at the lower front end of the third arm parts 51c and 51c; and a pair of bucket cylinders 10b and 10b that tilts the bucket 10a. However, not limited thereto, the work part 10 may be, for example, a dozer blade, an auger, a pallet fork, etc. The bucket cylinder 10b is pivotally connected to the bucket 10a and the third arm part 51c.

Figure 4:
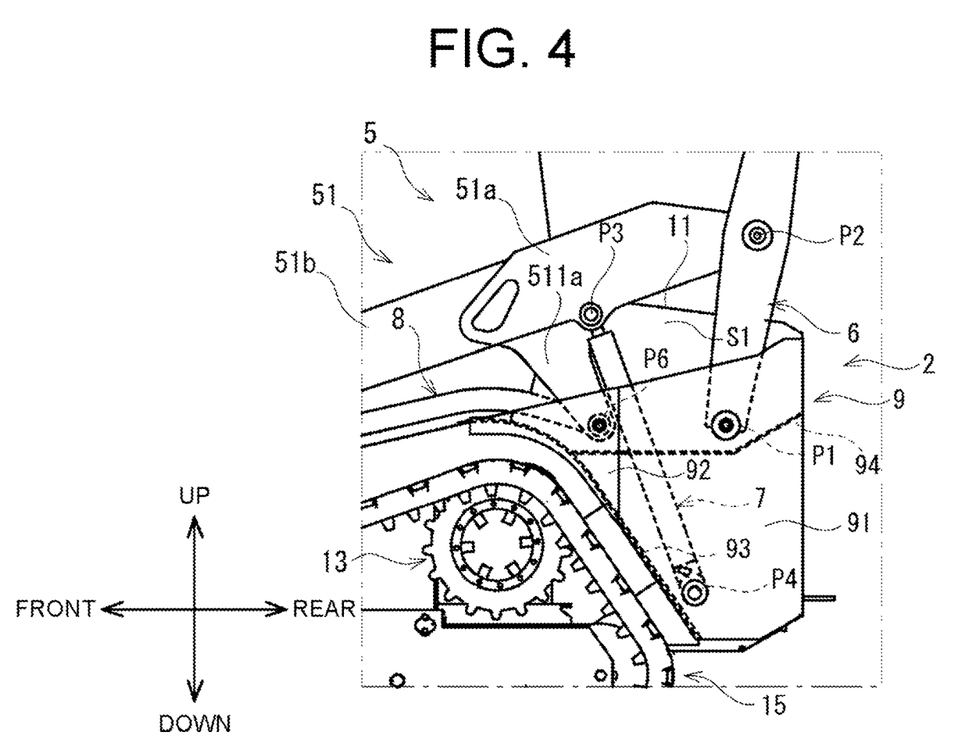
FIG. 4 is a left side view illustrating cover parts according to the same embodiment.

As illustrated in FIG. 4, the cover part 9 includes: a first cover part 91 that covers the first pivoting part P1 and the fourth pivoting part P4; a second cover part 92 that covers the sixth pivoting part P6 in a state that the arm 5 is lowered downward; a third cover part 93 that covers the pivoting parts P1, P4, and P6; and a fourth cover part 94 that prevents earth and sand entering from above. This allows to prevent the earth and sand caught up by the crawler 15 from attaching on the pivoting parts P1, P4, and P6, so that a maintenance frequency of the pivoting parts P1, P4, and P6 is able to be reduced. The cover part 9 is arranged on either side of the vehicle body 2.

The first cover part 91 and the second cover part 92 are arranged parallel to either lateral side of the vehicle body 2, while the third cover part 93 and the fourth cover part 94 is arranged perpendicular to the lateral side of the vehicle body 2. Furthermore, the third cover part 93 extends from the lower portion to the upper front portion of the vehicle body 2 along the crawler 15. Furthermore, the fourth cover part 94 includes a through hole (not illustrated) that is arranged along the front-rear direction between the first pivoting part P1 and the fourth pivoting part P4, for passing through the cylinder 7.

Figure 5:
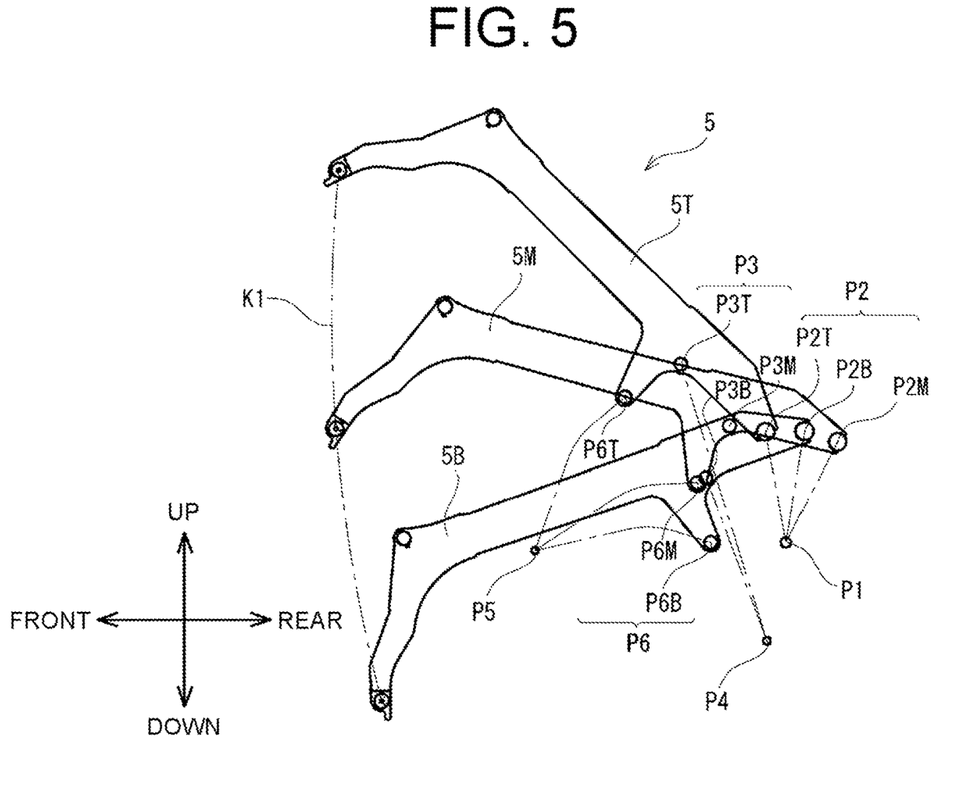
FIG. 5 is a left side view illustrating an oscillating locus of an arm according to the same embodiment.

As illustrated in FIG. 5, the extension-contraction operation of the cylinder 7 (see FIG. 1) allows the arm 5 to be oscillated along the oscillating locus K1. The oscillating locus K1 will be explained separately for the case in which the arm 5 is oscillated from the lowermost position 5B to the intermediate position 5M, and for the case in which the arm 5 is oscillated from the intermediate position 5M to the uppermost position 5T. The second pivoting part P2 when the arm 5 is located at the lowermost position 5B, the intermediate position 5M, and the uppermost position 5T, are respectively identified by P2B, P2M, and P2T, the third pivoting part P3 by P3B, P3M, and P3T, and the sixth pivoting part P6 by P6B, P6M, and P6T.

When the arm 5 is oscillated from the lowermost position 5B to the intermediate position 5M, the second pivoting part P2 moves rearward (from P2B to P2M) with the first pivoting part P1 as a fulcrum. The third pivoting part P3 moves upper-rearward (from P3B to P3M) with the fourth pivoting part P4 as a fulcrum. The sixth pivoting part P6 moves upward (from P6B to P6M) with the fifth pivoting part P5 as a fulcrum. Accordingly, the arm 5 is prevented from moving forward while drawing an arcuate locus, and the oscillating locus K1 of the arm 5 when oscillated from the lowermost position 5B to the intermediate position 5M becomes substantially perpendicular to the ground.

When the arm 5 is oscillated from the intermediate position 5M to the uppermost position 5T, the second pivoting part P2 moves forward (from P2M to P2T) with the first pivoting part P1 as a fulcrum. The third pivoting part P3 moves upper-forward (from P3M to P3T) with the fourth pivoting part P4 as a fulcrum. The sixth pivoting part P6 moves upper-forward (from P6M to P6T) with the fifth pivoting part P5 as a fulcrum. Accordingly, the arm 5 is prevented from moving backward while drawing an arcuate locus, and the oscillating locus K1 of the arm 5 when oscillated from the intermediate position 5M to the uppermost position 5T also becomes substantially perpendicular to the ground. Thus, oscillating the arm 5 to the intermediate position 5M moves the second pivoting part P2 rearward with the first pivoting part P1 as a fulcrum, so that the first visual recognition space S1 becomes wider. Accordingly, the visibility on the rear lateral sides is further improved when the vehicle body 2 is moved with the arm 5 under rearward movement, etc., being positioned in the intermediate position 5M.

As described above, the oscillating locus K1 when oscillating from the lowermost position 5B to the uppermost position 5T becomes substantially perpendicular to the ground. Accordingly, for example, in the case in which the oscillating locus K1 is arcuate, a working operation has to be performed taking into considerations that the bucket 10a moves in the front-rear direction, whereas in the case in which the oscillating locus K1 is substantially perpendicular, a working operation may be performed without taking into considerations that the bucket 10a (see FIG. 1) moves in the front-rear direction.

As described above, the work vehicle 1 according to the embodiment includes: the vehicle body 2; a pair of the traveling parts 3 arranged on both lateral sides of the vehicle body 2; the cabin 4 that is arranged at a front portion of the vehicle body 2 above the traveling parts 3; the arm 5 that extends from rear to front of the cabin 4 above the traveling parts 3 and that is pivotally connected in a manner capable of oscillating up and down; the first link 6 that connects the vehicle body 2 and the arm 5; the cylinder 7 that oscillates the arm 5; the second link 8 that is arranged between the arm 5 and the traveling parts 3 and that regulates an oscillating direction of the arm 5. The vehicle body 2 includes: the first pivoting part P1 that pivotally connects one end of the first link 6; the second pivoting part P2 that pivotally connects the other end side of the first link 6 and a rear end side of the arm 5, the third pivoting part P3 that is arranged in front of the second pivoting part P2 and that pivotally connects one end of the cylinder 7; the fourth pivoting part P4 that pivotally connects the other end of the cylinder 7; the fifth pivoting part P5 that pivotally connects one end of the second link 8 at a position further front than the first pivoting part P1 and the fourth pivoting part P4; and the sixth pivoting part P6 that pivotally connects the other end of the second link 8 at the tip end of the extended part 511a that extends from the arm 5 in front of the third pivoting part P3. In a state that the arm 5 is lowered downward, the sixth pivoting part P6 is arranged between the traveling part 3 and the cylinder 7.

This configuration allows to provide the first visual recognition space S1 between the first link 6 and the cylinder 7. This allow the operator in the cabin 4 to look in either rear lateral direction through the first visual recognition space S1 between the first link 6 and the cylinder 7, so that the visibility on the rear lateral sides of the cabin 4 is improved.

Furthermore, the work vehicle 1 according to the embodiment is configured so that in a state that the arm 5 is lowered downward, the fifth pivoting part P5 is arranged at a level lower than or equal to the sixth pivoting part P6.

With this configuration, the entire arm 5 is allowed to be arranged lower than hitherto by bringing the second link 8 close to the traveling part 3, so that, for example, the visibility on both lateral sides of the cabin 4 is improved.

Furthermore, the work vehicle 1 according to the embodiment is configured so that the sixth pivoting part P6 is arranged between the traveling part 3 and the cylinder 7, the second link 8 includes the bend 8a that conforms to the outer shape of the traveling part 3, and the traveling part 3 is arranged close to the bend 8a.

With this configuration, the entire arm 5 is allowed to be arranged lower than hitherto by bringing the second link 8 closer to the traveling part 3, so that, for example, the visibility on both lateral sides of the cabin 4 is improved.

Furthermore, the work vehicle 1 according to the embodiment is configured so that the traveling part 3 includes a triangle crawler (crawler 15) that has a first slope 15e located at its front portion and a second slope 15f located at its rear portion, and in a state that the arm 5 is lowered downward, the fifth pivoting part P5 is arranged at a level lower than or same as the sixth pivoting part P6 and above the first slope 15e, while the sixth pivoting part P6 is arranged between the second slope 15f and the cylinder 7.

With this configuration, the entire arm 5 is allowed to be arranged lower than hitherto by bringing the second link 8 closer to the traveling part 3, whereby, for example, the visibility on both lateral sides of the cabin 4 is improved.

Furthermore, the work vehicle 1 according to the embodiment is configured as follows. The work vehicle 1 includes the vehicle body 2 and a pair of the traveling parts 3 arranged on both lateral sides of the vehicle body 2. The traveling part 3 includes a drive wheel 13 that drivingly rotates, the driven part 14 that is arranged under the drive wheel 13 and that is fixed on either side of a lower portion of the vehicle body 2, and the crawler 15 that is like an endless belt and that is provided in a tensioned state by the drive wheel 13 and the driven part 14. The driven part 14 includes the first driven wheel 17 and the second driven wheel 18 that are arranged respectively in lower-front of and lower-behind the drive wheel 13, and the support part 21 to which the first driven wheel 17 and the second driven wheel 18 are rotatably mounted. The support part 21 includes at its upper portion the roof part 211a that has a substantially isosceles triangle shape in cross section, and a pair of the side wall parts 212a and 212a that extend downward from the roof part 211a.

This configuration allows to prevent the earth and sand caught up by the crawler 15 from accumulating on the support part 21.

Furthermore, the work vehicle 1 according to the embodiment is configured so that the driven part 14 includes the plurality of track rollers 16 that are arranged parallel to the front-rear direction under the drive wheel 13, and the equalizer 20 that connects some of the plurality of track rollers 16, and so that the plurality of the track rollers 16 and the equalizer 20 are mounted to the support part 21 in a rotatable manner and in an oscillatable manner, respectively.

This configuration allows the equalizer 20 to oscillate some of the plurality of the track rollers 16 when running over obstacles such as stones during traveling on soft ground or rough terrain, whereby shocks from the ground is able to be absorbed.

The work vehicle 1 according to the embodiment is configured so that the roof part 211a includes at its rear portion the cutout 213a for avoiding the drive wheel 13.

This configuration allows to employ a larger drive wheel 13, compared with a case in which no cutout 213a is provided.

Furthermore, the work vehicle 1 according to the embodiment is configured so that the equalizer 20 is connected in an oscillatable manner to the support part 21 via an elastic body.

This configuration allows to absorb shocks from the ground when running over obstacles such as stones.

Although the embodiment and other embodiments have been described with reference to the drawings, it should be considered that a specific configuration is not limited to the embodiments. The scope of the present disclosure is defined not only by the description of the above embodiments but by the scope of the claims, and further includes all modifications within the meaning and scope of the claims and equivalents.

DESCRIPTION OF REFERENCE NUMERALS 1 work vehicle
2 vehicle body
3 traveling part
4 cabin
5 arm
6 first link
7 cylinder
8 second link
8a bend
15 crawler
15e first slope
15f second slope
P1 first pivoting part
P2 second pivoting part
P3 third pivoting part
P4 fourth pivoting part
P5 fifth pivoting part
P6 sixth pivoting part

The invention claimed is:

1. A work vehicle comprising:
a vehicle body;
a pair of traveling parts arranged on both lateral sides of the vehicle body;
a cabin arranged at a front portion of the vehicle body above the traveling parts;
an arm that extends from rear to front of the cabin above the traveling parts and that is pivotally connected in a manner capable of oscillating up and down;
a first link that connects the vehicle body and the arm;
a cylinder that oscillates the arm;
a second link that is arranged between the arm and the traveling parts, and that regulates an oscillating direction of the arm;
a first pivoting part that pivotally connects one end of the first link;
a second pivoting part that pivotally connects an other end side of the first link and a rear end side of the arm;
a third pivoting part that is arranged in front of the second pivoting part and that pivotally connects one end of the cylinder;
a fourth pivoting part that pivotally connects an other end of the cylinder;
a fifth pivoting part that pivotally connects one end of the second link at a position further front than the first pivoting part and the fourth pivoting part;
a sixth pivoting part that pivotally connects an other end of the second link at a tip end of an extended part that extends from the arm in front of the third pivoting part, and
the traveling part includes a triangle crawler that has a first slope located at its front portion and a second slope located at its a rear portion,
wherein in a state that the arm is lowered downward, the sixth pivoting part is arranged between the traveling part and the cylinder, and the second link has a bend that conforms to the first slope and the second slope and,
wherein in a state that the arm is lowered downward, the fifth pivoting part is arranged at a level lower than the sixth pivoting part.

2. The work vehicle according to claim 1, wherein in a state that the arm is lowered downward, the first slope and the second slope are arranged close to the bend.

3. The work vehicle according to claim 1, wherein in a state that the arm is lowered downward, the fifth pivoting part is located above the first slope, while the sixth pivoting part is arranged between the second slope and the cylinder.

* * * * *